United States Patent
Day et al.

(10) Patent No.: US 11,513,202 B2
(45) Date of Patent: Nov. 29, 2022

(54) ELECTRONIC DISTANCE METER AND METHOD OF DETERMINING A DISTANCE WITH AN ELECTRONIC DISTANCE METER

(71) Applicant: Trimble AB, Danderyd (SE)

(72) Inventors: Richard Day, Fontenay sous bois (FR); Pascal Alexiade, Fontenay sous bois (FR); Joachim Borner, Fontenay sous bois (FR)

(73) Assignee: Trimble AB, Danderyd (SE)

( * ) Notice: Subject to any disclaimer, the term of this patent is extended or adjusted under 35 U.S.C. 154(b) by 572 days.

(21) Appl. No.: 16/663,137

(22) Filed: Oct. 24, 2019

(65) Prior Publication Data
US 2020/0264291 A1 Aug. 20, 2020

(30) Foreign Application Priority Data
Feb. 15, 2019 (EP) .................................. 19157551

(51) Int. Cl.
| | |
|---|---|
| *G01S 7/497* | (2006.01) |
| *G01S 7/48* | (2006.01) |
| *G01S 17/10* | (2020.01) |
| *G01S 7/4865* | (2020.01) |
| *G01S 7/487* | (2006.01) |

(52) U.S. Cl.
CPC ............ *G01S 7/497* (2013.01); *G01S 7/4808* (2013.01); *G01S 7/4865* (2013.01); *G01S 7/4876* (2013.01); *G01S 17/10* (2013.01)

(58) Field of Classification Search
CPC ...... G01S 7/497; G01S 7/4808; G01S 7/4865; G01S 7/4876; G01S 17/10; G01S 7/493; G01S 7/4811; G01S 17/08; G01S 7/4818; G01S 7/4868; G01S 7/4915; G01S 7/4918
See application file for complete search history.

(56) References Cited

U.S. PATENT DOCUMENTS

| | | | | |
|---|---|---|---|---|
| 4,699,508 | A * | 10/1987 | Bolkow | ............... G01S 7/4865 356/5.07 |
| 5,345,243 | A * | 9/1994 | Levis | ..................... G01S 7/415 342/6 |
| 5,742,379 | A * | 4/1998 | Reifer | ..................... G01S 17/14 356/5.07 |
| 8,144,334 | B2 * | 3/2012 | Chinn | .................... G01H 9/004 356/482 |
| 10,795,005 | B2 * | 10/2020 | Hiromi | .................. G01S 17/08 |

(Continued)

*Primary Examiner* — Seung C Sohn
(74) *Attorney, Agent, or Firm* — Kilpatrick Townsend & Stockton LLP

(57) ABSTRACT

An electronic distance meter comprises a coupler located between a laser source and a target and adapted to divert a portion of measurement light emitted by the laser source into a calibration portion connected to a photodetector and comprising an attenuator between said coupler and said photodetector for varying the luminance value of the light passing through the calibration portion, said calibration portion having a known length and said processor being configured to perform distance measurements through the calibration portion at a variety of luminance values achieved by said attenuator to derive calibration values from said distance measurements and said known length, said processor being further configured to use said calibration values for determining a target distance based on a return pulse signal.

13 Claims, 1 Drawing Sheet

(56) References Cited

U.S. PATENT DOCUMENTS

2006/0007422 A1* 1/2006 Dimsdale .............. G01S 7/4868
356/4.02
2015/0378021 A1* 12/2015 Nagano .................. G01S 17/10
356/5.01

* cited by examiner

ELECTRONIC DISTANCE METER AND METHOD OF DETERMINING A DISTANCE WITH AN ELECTRONIC DISTANCE METER

CROSS-REFERENCE TO RELATED APPLICATIONS

The present application claims priority to EP Application No. 19157551.3, filed Feb. 15, 2019, the contents of which are incorporated herein by reference in their entirety for all purposes.

FIELD

The invention concerns the field of range finding, and more particularly the field a laser-based electronics distance meters (EDM) dedicated to high precision Time Of Flight (TOF) measurement between two fine optical pulses.

BACKGROUND

Such telemeters include laser rangefinders (3D scanners, Total stations), handheld laser distance meters, LIDAR and others. Laser implemented in such devices, generally emits a short laser pulse called "start pulse" to enlighten a target. A part of that laser pulse is sent back by the target towards the device in the form of a short pulse called "stop pulse".

The time interval between the start and stop pulses provides with the distance between the device and the target. The start and stop pulses have to be converted efficiently into electrical pulses so that the time position information of each is not significantly degraded to reach the wanted precision. The start and stop electrical pulses are both processed in a front-end EDM dedicated to TOF measurement.

These telemeters are however sensitive to the light amplitude level, ie the luminance of the reflected pulse. This means that, for a given target distance, the TOF measurement will vary with the luminance of the reflected pulse due to pulse width variation, gain variation, saturation, with all those variations being further temperature dependent.

In order to make up for that variation, the telemeters are conventionally calibrated during manufacturing, prior to delivery. This requires a compensation which is usually determined by setting the telemeter in a thermal chamber and stabilizing it at a set of different temperatures while performing measurements at a fixed distance on a varying albedo target. The acquired data are then filtered, averaged and a compensation table is calculated and store as a calibration file in the instrument.

This calibration is then used for the lifetime of the telemeter, and, during scanning, the compensation is applied by the software based on the measured luminance and the calibration table values.

This setup has significant drawbacks due to the fact that it requires a specific thermal chamber as well as a specific calibration step for the manufacturing of the telemeters. Furthermore, the calibration is done only once and for all in the factory. This means that, if the telemeter experiences drift and changes over time, the calibration will become irrelevant, and the customer is required to send the instrument back for maintenance.

SUMMARY

The inventions aims at improving the situation. To that end, the invention proposes an electronic distance meter comprising a laser source adapted for emitting a measurement light toward a target, a photodetector adapted for receiving return light reflected by the target and for outputting a corresponding return signal, and a processor capable of determining a target distance based on said return signal. This electronic distance meter further comprises a coupler located between said laser source and said target and adapted to divert a portion of the measurement light emitted by the laser source into a calibration portion connected to said photodetector and comprising an attenuator between said coupler and said photodetector for varying the luminance value of the light passing through the calibration portion, said calibration portion having a known length and said processor being further arranged to perform distance measurements through the calibration portion at a variety of luminance values achieved by said attenuator to derive calibration values from said distance measurements and said known length, said processor being further arranged to use said calibration values for determining a target distance based on said return pulse signal.

This telemeter is particularly advantageous because it performs a calibration prior to every measurement. This means that the calibration step can be eliminated at the factory along with the thermal chamber, and also that there is no risk of calibration drift with time.

Various embodiments of the device according to the invention may comprise one or more of the following features:
- the electronic distance meter further comprises a delay line located between said coupler and said target such that the light which is not diverted by the coupler in the calibration portion is delayed by a chosen duration,
- the electronic distance meter further comprises a delay line located between said target and said photodetector such that the light which is reflected by said target is delayed by a chosen duration,
- the delay line is chosen such that the chosen duration allows determining said calibration values before light reflected from the target is received by said photodetector,
- the processor is arranged, for each luminance value achieved by said attenuator, to remove irrelevant distance measurements and to average the remaining distance measurements in order to derive said calibration values.
- the electronic distance meter further comprises a collimator downstream of said coupler for focusing the light on said target,
- the electronic distance meter further comprises a collimator upstream of said photodetector for focusing the return light, and
- said attenuator is arranged such that the amount of distance measurements for each luminance value is substantially equal to a chosen value.

The invention also concerns a method for measuring a distance with an electronic distance meter comprising the following operations:
a) emitting a measurement light with a laser source for measuring a return light reflected by a target,
b) diverting a portion of the measurement light emitted by the laser source into a calibration portion having a known length,
c) varying the luminance value of the light passing through the calibration portion with an attenuator,
d) measuring distance measurements for the light passing through the calibration portion with a photodetector,
e) deriving calibration values from said distance measurements and said known length, f) using said calibration values to determine target distance based on the return light reflected by the target.

Various embodiments of the method according to the invention may comprise one or more of the following features:
  g) after operation b), delaying the measurement light emitted toward the target for a chosen duration,
  the chosen duration is such that the return light reflected by the target reaches the photodetector after completion of operation e),
  step e) comprises, for each luminance value of step c), removing irrelevant distance measurements obtained in step d) and averaging the remaining distance measurements, and
  step c) comprises producing substantially the same amount of measurements in step d) for each luminance value.

BRIEF DESCRIPTION OF THE DRAWINGS

Other features and advantages of the invention will readily appear in the following specification, which describes examples taken from the drawings in a non-limiting manner. The drawings are intended to help better understand the invention by way of illustration but may also be used to define it if necessary. On these drawings.

DETAILED DESCRIPTION

Figure 1:
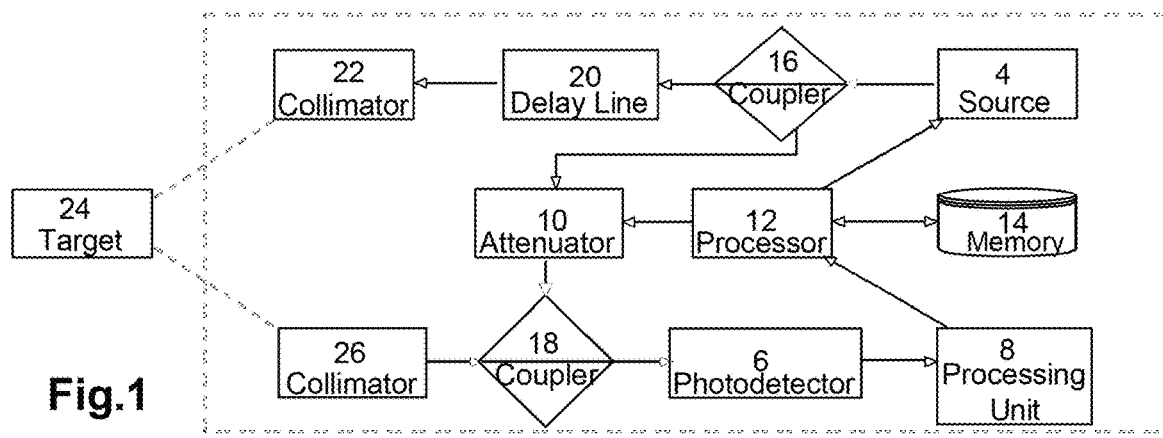
FIG. 1 shows a generic representation of an electronic distance meter according to the invention.

FIG. 1 shows a generic representation of an electronic distance meter 2 (hereinafter "EDM") according to the invention.

EDM 2 comprises a light source 4, a photodetector 6, a front-end electronic signal processing unit 8, an attenuator 10, a processor 12 and a memory 14. The attenuator is arranged optically between the light source 4 and the photodetector 6 by means of respective couplers 16 and 18.

The EDM 2 may be a radar, laser rangefinder (a 3D scanner or a total station), a handheld laser distance meter, a LIDAR or any other laser-based TOF distance measurement device.

According to this embodiment, the light source 4 is a laser source arranged to output light pulses having a width of the order of 1 ns. This allows to achieve millimeter precision on the TOF measurements. In other embodiments, the light source 4 may be adapted according to the distance meter type. It could also be a modulated continuous wave laser source.

The photodetector 6 and front end electronic signal processing unit 8 may also be chosen according to the type of EDM selected. In this embodiment, they provide a suitable bandwidth to manage nanosecond or sub nanosecond pulse width or high bandwidth modulation rate.

The attenuator 10 may be realized by any suitable architecture, such as a rotating/translating grey wedge, a fibered variable optical attenuator, a MEMS based fibered Variable Optical Attenuator, a rotating polarizer a prism based variable optical attenuator or any other means suitable for implementing its architecture and functions as described herein below.

The processor 12 may be any type of processing capable element adapted to perform the calculus and operations described herein. It may be a general-purpose microprocessor for personal computers, graphic cards or other electronic devices, a specialized chip such as a FPGA or a SoC (System on Chip), a computing source in a grid, a microcontroller, an ASIC or any other element capable of providing the computing power for those calculus and/or operations. One or more of the elements may be combined, including those necessary to drive the attenuator 10.

The memory 14 stores all the configuration data for driving the laser source 4, the front-end electronic signal processing unit 8 and the attenuator 10, as well a distance/luminance calibration data for use in the distance measurements, and eventual temporary measurement data. It may be realized in any way suitable, that is by means of a hard disk drive, a solid-state drive, a flash memory, a memory embedded in the processor 12, a distant storage accessible in the cloud, etc.

Coupler 16 is arranged such that about 1% of the output power of the laser source 4 is directed toward the attenuator 10. The coupler 16 can be realized by any means suitable such as a fiber coupler, a polarizing or non-polarizing beam splitter (cube or plate). The rest of the light emitted by the laser source 4 is processed through a delay line 20 connected to a collimator 22 so as to focus this light on a target 24. Delay line 20 can be realized by any means like a fiber cord, a delay line cell.

Figure 3:
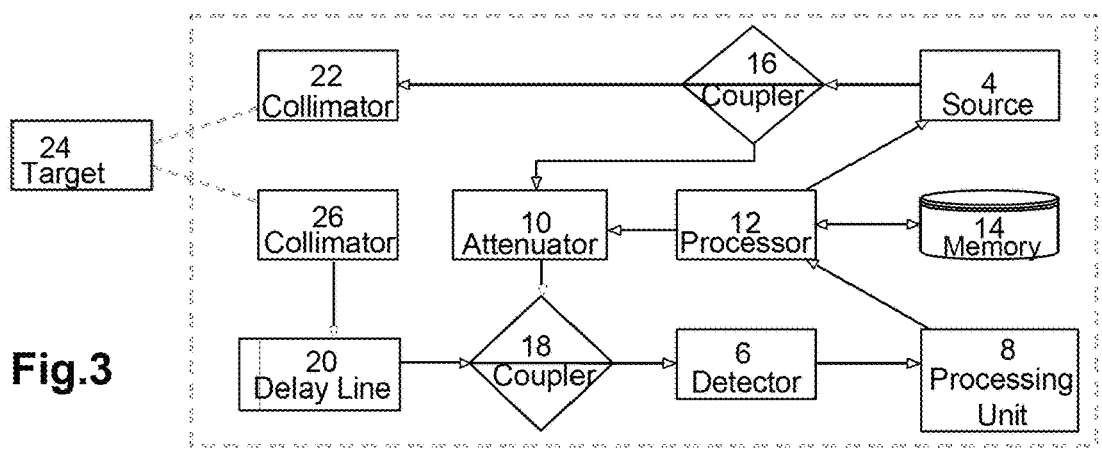
FIG. 3 shows a generic representation of an electronic distance meter according to a second embodiment.

Coupler 18 can be realized by any means suitable like a fiber coupler, a polarizing or non-polarizing beam splitter (cube or plate) or even purely virtual, the two laser beams from the target 24 and the attenuator 10 impinging onto the detector 6 at different angles. As shown in FIG. 3, the delay line 20 could be located in the return signal path, before coupler 18.

In the scanning mode, the target 24 thereafter reflects a return pulse (or continuous wave) through a collimator 26 onto the photodetector 6 which is processed through a front-end signal processing unit 8. The results of this processing are sent to processor 12 in order to determine distance measurements. The output of attenuator 10 is kept at an undetectable level due to low transmission.

The portion of the EDM 2 in which the light travels from the light source 4 through the coupler 16, the attenuator 10, the coupler 18 to the photodetector 6 is herein referred as a calibration portion. This calibration portion is used to perform a calibration mode, in which distance/luminance calibration data is acquired in order to determine calibration data prior to each measurement.

In the calibration mode, output of attenuator 10 is coupled to the photodetector 6, which output is processed through the front-end signal processing unit 8. The results of this processing are sent to the processor 12 to determine distance measurements. Using the same electronic chain is particularly advantageous in order to be able to perform the distance/luminance calibration since it is that precise chain which may be affected by drift and non-linearities and requires to be calibrated.

Advantageously, the attenuator 10 may be chosen such that, in combination with the amount of light received from coupler 16, the output of the attenuator 10 is able to vary on a large range to cover the whole dynamic range of the photodetector 6. For example, in the example described herein, by using an attenuator 10 capable of achieving a −50 dB attenuation, and by combining it with a light corresponding to 1% of the output of the laser source 4, a precision of about $10^{-7}$ the output of the laser source 4 can be achieved.

This is excellent in view of the fact that a measurement of a target located at 100 m usually returns a light pulse having an amplitude which is about 10^-8 the output of the laser source 4. This way, only 1% of the emitted power is used for calibration while achieving a suitable measurement.

Figure 2:
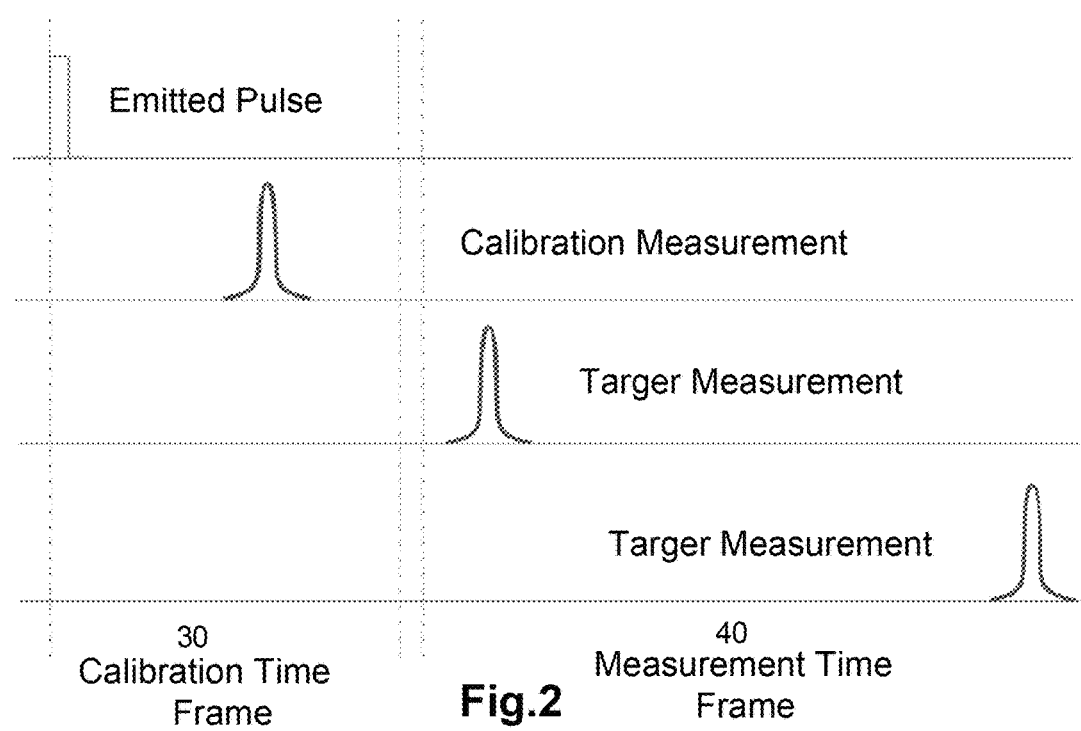
FIG. 2 shows a generic representation of measurements timeframes of the electronic distance meter of FIG. 1.

As shown on FIG. 2, in this embodiment, delay line 22 allows to perform the distance calibration in a time frame referenced 30 which precedes the time frame referenced 40 of the actual measurements. In this manner, the distance/luminance calibration measurement can be performed before any target returned pulse (or continuous wave) is measured.

In order to perform the distance/luminance calibration, the processor 12 drives the laser source 4 to emit light at its nominal output, and it drives the attenuator 10 using a single ramp adapted to allow a good distribution of the calibration measurements. With each attenuation value, the attenuator 10 sends the attenuated light received from coupler 16 to the photodetector 6 and the resulting measurement is processed by the front-end electronic signal processing unit 8 and stored in the memory 14. Due to the small width and the high repetition rate of the pulses of light-source 4, a great number of measurements (100 in the example described herein) can be obtained for each attenuation value (1000 in the example described herein), and the whole calibration measurements can be performed with a single ramp in about 1 second.

The resulting measurements are then treated by the processor 12 in order to filter out, for each attenuation value, the measurements which are obviously irrelevant, and then to average out the remaining values. Since the exact distance traveled by the light in the calibration portion is known, the average distance values obtained allow to determine calibration data for each luminance value achieved by the attenuator 10. The high number of measurements for each luminance value also allow to maintain the quality of calibration process by averaging over the values, thereby minimizing the noise in the calibration process.

In some embodiments, the most recent calibration data for a given temperature could be stored in memory 14. This way, if a calibration mode is unavailable for any reason, the EDM 2 can still perform measurements using calibration data for a given temperature. This improves the availability of the EDM in a degraded mode. In some other embodiments, the fact that, for a given temperature, the calibration data should remain relatively stable, a history of previous calibration data can also be kept for each temperature. Each time a new calibration data is determined, the processor 12 can compare it to the historical calibration data in order to allow determining that the EDM 2 is starting to experience problem.

The distance/luminance calibration data can thus be used by the processor 12 in order to achieve high precision measurements, with on the spot calibration values. This allows to completely remove the calibration process during manufacturing known in the art, and also allows to have more precise calibration data, as they are determined on site, prior to all measurements. Furthermore, as the calibration only takes about 1 second, the user of EDM 2 is not affected in any manner.

In other embodiments, the delay line 22 could be omitted, and the processor 12 could be arranged to perform distance/luminance calibration and standard distance measurement simultaneously. The processor 12 can then determine the distance/luminance calibration data and use it to correct the standard distance measurements prior to outputting them.

The invention claimed is:

1. Electronic distance meter comprising:
   a laser source adapted for emitting a measurement light toward a target,
   a photodetector adapted for receiving return light reflected by the target and for outputting a corresponding return signal, and
   a processor configured to determine a target distance based on said return signal, wherein said electronic distance meter further comprises a coupler located between said laser source and said target and adapted to divert a portion of the measurement light emitted by the laser source into a calibration portion connected to said photodetector and comprising an attenuator between said coupler and said photodetector for varying the luminance value of the light passing through the calibration portion, said calibration portion having a known length and said processor being further configured:
   to perform distance measurements through the calibration portion at a variety of luminance values achieved by said attenuator to derive calibration values from said distance measurements and said known length,
   to remove irrelevant distance measurements for each luminance value achieved by said attenuator and to compute a representative value based on remaining distance measurements in order to derive said calibration values, and
   to use said calibration values for determining the target distance based on said return signal.

2. Electronic distance meter according to claim 1, further comprising a delay line located between said coupler and said target such that the light which is not diverted by the coupler in the calibration portion is delayed by a chosen duration.

3. Electronic distance meter according to claim 1, further comprising a delay line located between said target and said photodetector such that the light which is reflected by said target is delayed by a chosen duration.

4. Electronic distance meter according to claim 2, wherein the delay line is chosen such that the chosen duration allows determining said calibration values before light reflected from the target is received by said photodetector.

5. Electronic distance meter according to claim 1, wherein the representative value is an average of the remaining distance measurements.

6. Electronic distance meter according to claim 1, further comprising a collimator downstream of said coupler for focusing the light on said target.

7. Electronic distance meter according to claim 1, further comprising a collimator upstream of said photodetector for focusing the return light.

8. Electronic distance meter according to claim 1, wherein said attenuator is arranged such that the amount of distance measurements for each luminance value is substantially equal to a chosen value.

9. Method of determining a distance with an electronic distance meter comprising the following operations:
   a) emitting a measurement light with a laser source for measuring a return light reflected by a target,
   b) diverting a portion of the measurement light emitted by the laser source into a calibration portion having a known length,
   c) varying A luminance value of the light passing through the calibration portion with an attenuator, d) measuring distance measurements for the light passing through the calibration portion with a photodetector, e) deriving calibration values from said distance measurements and said known length, wherein deriving the calibration values comprises, for each luminance value of step (c), removing irrelevant distance measurements obtained in step (d) and computing a representative value based on remaining distance measurements, and f) using said calibration values to determine target distance based on the return light reflected by the target.

10. Method according to claim 9, further comprising the following operation:

g) after operation b), delaying the measurement light emitted toward the target for a chosen duration.

11. Method according to claim 10, wherein the chosen duration is such that the return light reflected by the target reaches the photodetector after completion of operation e).

12. Method according to claim 9, wherein the representative value is an average of the remaining distance measurements.

13. Method according to claim 9, wherein step c) comprises producing substantially the same amount of measurements in step d) for each luminance value.

\* \* \* \* \*